(12) United States Patent
Merlin et al.

(10) Patent No.: US 9,066,287 B2
(45) Date of Patent: Jun. 23, 2015

(54) SYSTEMS AND METHODS OF RELAY SELECTION AND SETUP

(71) Applicant: Qualcomm Incorporated, San Diego, CA (US)

(72) Inventors: Simone Merlin, San Diego, CA (US); Zhi Quan, San Diego, CA (US); Santosh Paul Abraham, San Diego, CA (US); Hemanth Sampath, San Diego, CA (US)

( * ) Notice: Subject to any disclaimer, the term of this patent is extended or adjusted under 35 U.S.C. 154(b) by 200 days.

(21) Appl. No.: 13/743,103

(22) Filed: Jan. 16, 2013

(65) Prior Publication Data

US 2013/0188542 A1    Jul. 25, 2013

Related U.S. Application Data

(60) Provisional application No. 61/589,913, filed on Jan. 24, 2012.

(51) Int. Cl.
*H04W 40/22* (2009.01)
*H04W 40/12* (2009.01)
*H04W 84/04* (2009.01)
*H04W 84/12* (2009.01)

(52) U.S. Cl.
CPC .............. *H04W 40/22* (2013.01); *H04W 40/12* (2013.01); *Y02B 60/42* (2013.01); *Y02B 60/50* (2013.01); *H04W 84/047* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,336,923 | B2 | 2/2008 | Yadav |
| 7,362,722 | B2 | 4/2008 | Otsuka |
| 8,131,209 | B1 | 3/2012 | Chen et al. |
| 8,201,044 | B2 | 6/2012 | Chang et al. |
| 8,228,836 | B2 | 7/2012 | Erkip et al. |
| 8,243,623 | B2 | 8/2012 | Gong et al. |
| 2003/0208616 | A1 | 11/2003 | Laing et al. |
| 2005/0195753 | A1 | 9/2005 | Chaskar et al. |
| 2006/0084377 | A1 | 4/2006 | Lee et al. |
| 2006/0146752 | A1 | 7/2006 | Jang et al. |
| 2007/0072600 | A1 | 3/2007 | Cho et al. |

(Continued)

FOREIGN PATENT DOCUMENTS

| | | |
|---|---|---|
| EP | 1126636 A2 | 8/2001 |
| EP | 1341346 A2 | 9/2003 |

(Continued)

OTHER PUBLICATIONS

Aust S., et al., "IEEE 802.11ah: Advantages in standards and further challenges for sub 1 GHz Wi-Fi", Communications (ICC), 2012 IEEE International Conference on, IEEE, Jun. 10, 2012, pp. 6885-6889, XP032274723, DOI: 10.1109/ICC.2012.6364903 ISBN: 978-1-4577-2052-9 the whole document.

(Continued)

*Primary Examiner* — Brandon Renner
(74) *Attorney, Agent, or Firm* — S. Hossain Beladi

(57) ABSTRACT

A particular method includes receiving, at an access point, one or more request messages from one or more relay nodes, each of the one or more request messages is a probe request message or an association request message related to a station. The method includes selecting a communication path between the access point and the station based on the one or more request messages and sending a response message indicating the selected communication path.

40 Claims, 6 Drawing Sheets

(56) References Cited

U.S. PATENT DOCUMENTS

| | | | |
|---|---|---|---|
| 2007/0081479 A1 | 4/2007 | Kang et al. | |
| 2007/0127367 A1 | 6/2007 | Ogasahara et al. | |
| 2007/0189283 A1* | 8/2007 | Agarwal et al. | 370/388 |
| 2007/0248065 A1 | 10/2007 | Banerjea et al. | |
| 2007/0253395 A1 | 11/2007 | Graves et al. | |
| 2008/0013459 A1* | 1/2008 | Do et al. | 370/248 |
| 2008/0057973 A1* | 3/2008 | Park | 455/452.2 |
| 2008/0137581 A1 | 6/2008 | Doppler et al. | |
| 2008/0162516 A1 | 7/2008 | Shinomiya | |
| 2008/0188177 A1 | 8/2008 | Tan et al. | |
| 2008/0205385 A1 | 8/2008 | Zeng et al. | |
| 2008/0221988 A1 | 9/2008 | Bappu et al. | |
| 2008/0232256 A1* | 9/2008 | Douglas et al. | 370/237 |
| 2008/0247399 A1 | 10/2008 | Hazard | |
| 2008/0310348 A1 | 12/2008 | Nandagopalan et al. | |
| 2008/0316954 A1* | 12/2008 | Zheng | 370/315 |
| 2009/0028086 A1 | 1/2009 | Tay et al. | |
| 2009/0052327 A1* | 2/2009 | Larsson et al. | 370/238 |
| 2009/0073945 A1 | 3/2009 | Seok | |
| 2009/0190515 A1 | 7/2009 | Finn et al. | |
| 2009/0296578 A1* | 12/2009 | Bernard et al. | 370/231 |
| 2009/0304008 A1 | 12/2009 | Kono et al. | |
| 2010/0027494 A1 | 2/2010 | Kwon et al. | |
| 2010/0035541 A1 | 2/2010 | Kim et al. | |
| 2010/0046417 A1* | 2/2010 | Tamura | 370/315 |
| 2010/0046420 A1* | 2/2010 | Hart et al. | 370/315 |
| 2010/0061272 A1 | 3/2010 | Veillette | |
| 2010/0142433 A1 | 6/2010 | Womack et al. | |
| 2010/0157821 A1* | 6/2010 | Morris | 370/252 |
| 2010/0157845 A1 | 6/2010 | Womack et al. | |
| 2010/0167743 A1* | 7/2010 | Palanki et al. | 455/436 |
| 2010/0177807 A1 | 7/2010 | Zhang | |
| 2010/0189044 A1 | 7/2010 | Roy et al. | |
| 2010/0191839 A1 | 7/2010 | Gandhewar et al. | |
| 2010/0195665 A1 | 8/2010 | Jackson | |
| 2010/0246480 A1* | 9/2010 | Aggarwal et al. | 370/328 |
| 2010/0260096 A1 | 10/2010 | Ulupinar et al. | |
| 2011/0002337 A1 | 1/2011 | Akahane et al. | |
| 2011/0007692 A1 | 1/2011 | Seok | |
| 2011/0032864 A1 | 2/2011 | Lee et al. | |
| 2011/0032924 A1* | 2/2011 | Lee et al. | 370/345 |
| 2011/0038480 A1 | 2/2011 | Lin | |
| 2011/0051629 A1 | 3/2011 | Chun et al. | |
| 2011/0058551 A1 | 3/2011 | Fernandez | |
| 2011/0149804 A1 | 6/2011 | Denteneer et al. | |
| 2011/0228697 A1 | 9/2011 | Yano et al. | |
| 2011/0228755 A1 | 9/2011 | Seok | |
| 2011/0243062 A1 | 10/2011 | Wang et al. | |
| 2011/0244851 A1 | 10/2011 | Gunnarsson et al. | |
| 2011/0249609 A1 | 10/2011 | Brusilovsky et al. | |
| 2011/0292862 A1 | 12/2011 | Shimizu | |
| 2011/0305190 A1 | 12/2011 | Seki | |
| 2011/0305339 A1 | 12/2011 | Norrman et al. | |
| 2011/0310912 A1 | 12/2011 | Cai et al. | |
| 2012/0002589 A1 | 1/2012 | Saifullah et al. | |
| 2012/0008596 A1 | 1/2012 | Jung et al. | |
| 2012/0015659 A1* | 1/2012 | Kalyani et al. | 455/436 |
| 2012/0051240 A1 | 3/2012 | Dwivedi et al. | |
| 2012/0051346 A1 | 3/2012 | Herbert et al. | |
| 2012/0135677 A1 | 5/2012 | Hsu et al. | |
| 2012/0155301 A1 | 6/2012 | Miyazaki et al. | |
| 2012/0182878 A1 | 7/2012 | Qian | |
| 2012/0182926 A1 | 7/2012 | Yu et al. | |
| 2012/0188931 A1 | 7/2012 | Lee et al. | |
| 2012/0208545 A1 | 8/2012 | Yang et al. | |
| 2012/0218977 A1 | 8/2012 | Seok | |
| 2012/0233331 A1 | 9/2012 | Voccio et al. | |
| 2012/0243483 A1 | 9/2012 | Ahmadi et al. | |
| 2012/0258688 A1 | 10/2012 | Mizukoshi | |
| 2012/0307685 A1 | 12/2012 | Kim et al. | |
| 2012/0314621 A1 | 12/2012 | Finn et al. | |
| 2012/0317619 A1 | 12/2012 | Dattagupta et al. | |
| 2013/0094429 A1 | 4/2013 | Seok | |
| 2013/0114491 A1* | 5/2013 | Kim et al. | 370/312 |
| 2013/0235760 A1 | 9/2013 | Merlin et al. | |
| 2013/0235788 A1 | 9/2013 | Abraham et al. | |
| 2013/0235789 A1 | 9/2013 | Abraham et al. | |
| 2013/0235790 A1 | 9/2013 | Abraham et al. | |
| 2013/0235791 A1 | 9/2013 | Abraham et al. | |
| 2013/0235792 A1 | 9/2013 | Abraham et al. | |
| 2013/0336196 A1 | 12/2013 | Abraham et al. | |
| 2014/0003426 A1 | 1/2014 | Sankar et al. | |
| 2014/0064184 A1 | 3/2014 | Cherian et al. | |
| 2014/0064196 A1 | 3/2014 | Abraham et al. | |
| 2014/0086215 A1 | 3/2014 | Duo et al. | |

FOREIGN PATENT DOCUMENTS

| | | |
|---|---|---|
| EP | 1732265 A1 | 12/2006 |
| EP | 1924009 A1 | 5/2008 |
| TW | I233731 B | 6/2005 |
| WO | 03096554 A2 | 11/2003 |
| WO | 2004032426 A1 | 4/2004 |
| WO | 2007046630 A2 | 4/2007 |
| WO | 2007063521 A2 | 6/2007 |
| WO | 2008038247 A2 | 4/2008 |
| WO | 2008045632 A1 | 4/2008 |
| WO | 2009106616 A1 | 9/2009 |
| WO | 2010143894 A2 | 12/2010 |

OTHER PUBLICATIONS

He X., et al., "Cooperative RTS/CTS MAC with relay selection in distributed wireless networks", Ultra Modern Telecommunications &Workshops, 2009, ICUMT '09, International Conference on, IEEE, Piscataway, NJ, USA, Oct. 12, 2009, pp. 1-8, XP031574263, ISBN: 978-1-4244-3942-3 the whole document.

Kim D.W., et al., "A Robust and Cooperative MAC Protocol for IEEE 802.11a Wireless Networks", Wireless Personal Communications, Kluwer Academic Publishers, DO, vol. 67, No. 3, Sep. 23, 2011, pp. 689-705, XP035131529, ISSN: 1572-834X, DOI: 10.1007/S11277-011-0405-5 p. 696-p. 697.

Lim W.S., et al., "PR-MAC: A practical approach for exploiting relay transmissions in multi-rate WLANs", IEEE Transactions on Wireless Communications, IEEE Service Center, Piscataway, NJ, US, vol. 9, No. 1, Jan. 1, 2010, pp. 66-71, XP011299450, ISSN: 1536-1276 the whole document.

Wei, H. and Gitlin, R. "WWANIWLAN Two-Hop-Relay Architecture for Capactiy Enhancement" WCNC 2004 I IEEE Communications Society. 2004. pp. 225-230.

Zhu H., et al.,"Gamma DCF: A Relay-enabled Medium Access Control Protocol for Wireless Ad Hoc Networks", Mobile Computing, IEEE Transactions on Sep. 2006, U.S.A., IEEE, Sep. 2006, vol. 5, Issue:9, pp. 1201-1214.

3GPP TSG-RAN1 #58; Considerations on using Type II relay for UL transmission, Fujitsu, 3GPP, R1-093159, pp. 1-3, Shenzhen, China, Aug. 24-28, 2009.

Bahr M., "Proposed Routing for IEEE 802.11s WLAN Mesh Networks," WICON '06 The 2nd Annual International Wireless Internet Conference, Aug. 2-5, 2006, 10 pages.

Cerutti I., et al., "Delay Model of Single-Relay Cooperative ARQ Protocols in Slotted Radio Networks with Non-Instantaneous Feedback and Poisson Frame Arrivals," 2007, IEEE, pp. 2276-2280.

D-Link Forum BETA, Bridge Mode vs Relay vs Acess Point (AP) / Routers vs Dedicated Acess Points (AP), URL: <http://forums.dlink.com/index.php?topic=50738.0>, Retrieved on Jan. 22, 2013, 2 Pages.

International Search Report and Written Opinion—PCT/US2013/022205—ISA/EPO—May 3, 2013.

Lee M.J., et al., "Emerging Standards for Wireless Mesh Technology," Wireless Mesh Networking, IEEE Wireless Communications, IEEE, Apr. 2006, pp. 56-63.

Jain, "Wireless Mesh and Multi-Hop Relay Networks", Washington University, St. Louis, 2010, 24pgs.

Kumar, et al., "Technical Issues in IEEE 802.16j Mobile Multi-Hop Relay (MMR) Networks", European Journal of Scientific Research, 2011, pp. 507-533.

SA3: "Living Document on Key Security Issues of Relay Node Architectures", 3GPP Draft; S3-101106-Clean, 3rd Generation Part-

(56) References Cited

OTHER PUBLICATIONS nership Project (3GPP), Mobile Competence Centre ; 650, Route Des Lucioles ; F-06921 Sophia-Antipolis Cedex ; France, vol. SA WG3, No. Riga; 20100927, Oct. 7, 2010, XP050459845, [retrieved on Oct. 7, 2010].

Wei H-Y et al., "Two-Hop-Relay Architecture for Nextgeneration WWAN/WLAN Integration", IEEE Wireless Communications, IEEE Service Center, Piscataway, NJ, US, vol. 11, No. 2, Apr. 1, 2004, pp. 24-30, XP001196396, ISSN: 1536-1284, DOI: 10.1109/MWC.2004.1295734.

* cited by examiner

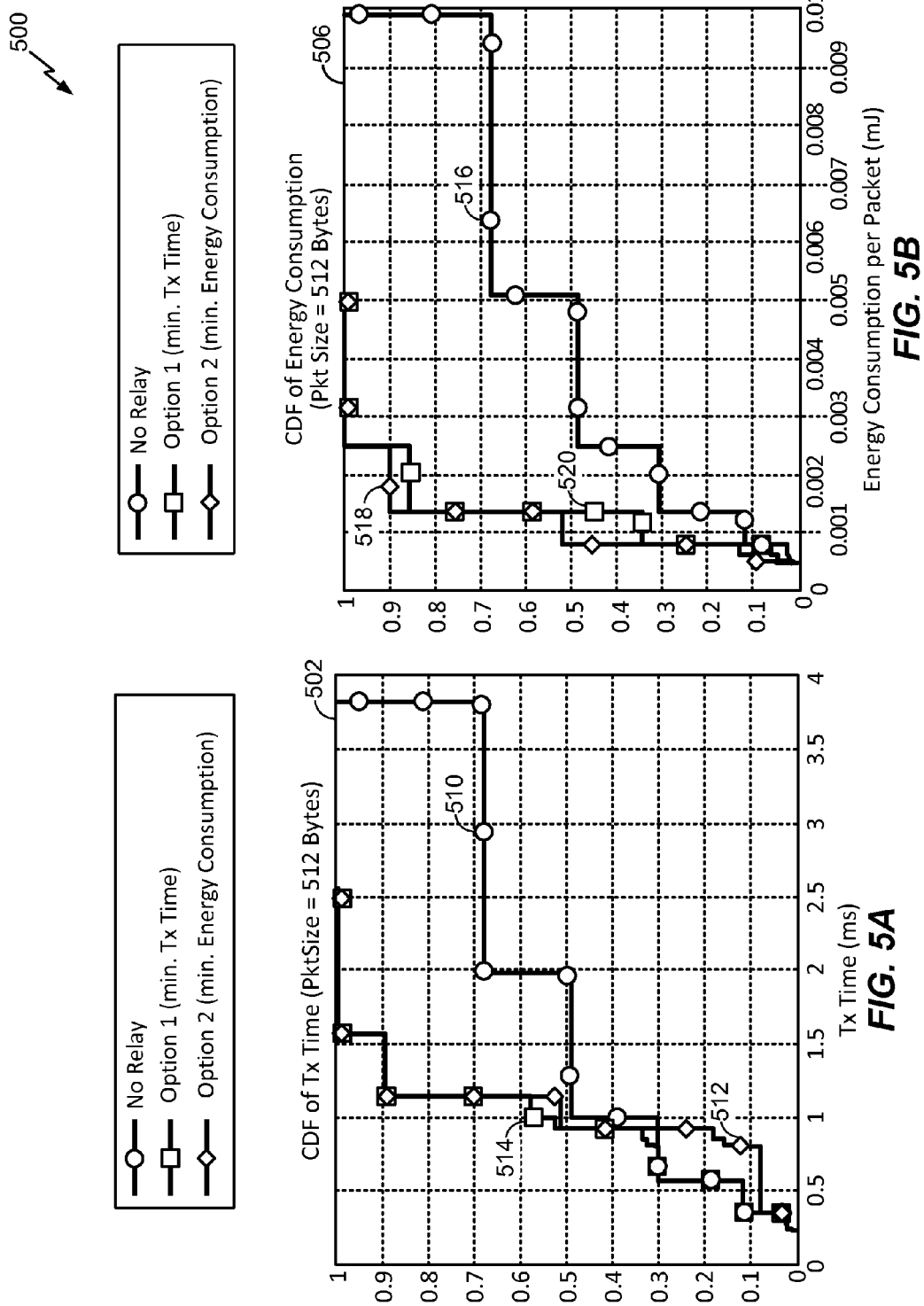

US 9,066,287 B2

SYSTEMS AND METHODS OF RELAY SELECTION AND SETUP

I. CLAIM OF PRIORITY

The present application claims priority from U.S. Provisional Patent Application No. 61/589,913 filed on Jan. 24, 2012, the contents of which are expressly incorporated herein by reference in their entirety.

II. FIELD

The present disclosure is generally related to selection and setup of relay nodes between a station and an access point.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Also, such wireless telephones can process executable instructions, including software applications, such as a web browser application, that can be used to access the Internet. As such, these wireless telephones can include significant computing capabilities.

Some devices may be configured to communicate data via a wireless network. For example, many devices are configured to operate according to an Institute of Electrical and Electronics Engineers (IEEE) 802.11 specification that enables wireless exchange of data via an access point. To illustrate, a wireless sensor may communicate with an access point over an IEEE 802.11ah compliant network protocol. Such a wireless sensor may have a low duty cycle and power constraints. For example, the wireless sensor (e.g., an IEEE 802.11ah compliant device) may be configured to wake up for a relatively short period of time to perform a few measurements, communicate a result of the measurements to a destination via the access point (or communicate the result to the access point), and then enter a sleep mode for a relatively long period of time. If the access point is located at a relatively large distance from the wireless sensor, the wireless sensor may use an increased transmission power resulting in increased power consumption at the wireless sensor. If the access point is located far away from the wireless sensor, transmission time from the wireless sensor to the access point may also increase. Increased power consumption at the wireless sensor and increased transmission time (i.e., increased medium occupancy) affect performance of the wireless sensor. Accordingly, to improve performance of the wireless sensor, it may be desirable to increase throughput of the wireless sensor and to decrease energy consumption at the wireless sensor.

IV. SUMMARY

Systems and methods of relay selection and setup are disclosed. In a particular embodiment, at least one relay node may be selected as part of a communication path between a station (e.g., a wireless sensor) and an access point, resulting in improved performance of the station. In one embodiment, the at least one relay node may be selected to increase (i.e., extend) a communication range of the station. For example, if the access point is out of communication range of the station and the at least one relay node is within the communication range of the station, the station may transmit data to the access point via the at least one relay. In another embodiment, the at least one relay node may reduce power consumption at the station. For example, if the station is closer to the at least one relay node than to the access point, the station may transmit data to the at least one relay node at a lower transmit power than transmitting the data to the access point. In another embodiment, use of a communication path including the at least one relay node may reduce transmission time compared to a communication path directly from the station to the access point, resulting in an improved throughput of the station. For example, transmission time from the station to the access point may be reduced if the station sends the data to a relay node located closer to the station (e.g., equidistant from the station and the access point, as shown in the simulation results of FIG. 3.

In a particular embodiment, a method includes receiving, at an access point, one or more request messages from one or more relay nodes, where each of the one or more request messages is a probe request message or an association request message related to a station. The method includes selecting a communication path between the access point and the station based on the one or more request messages and sending a response message that indicates the selected communication path.

In a particular embodiment, a method includes receiving, at an access point, at least two request messages related to a station, where a first request message of the at least two request messages is received from a relay node, and where each of the at least two request messages is a probe request message or an association request message related to the station. The method includes determining data rates corresponding to each request message and selecting a communication path between the access point and the station based on the data rates.

In a particular embodiment, a method includes sending a probe request message from a station, where the probe request message includes relay capability information of the station and where the probe request message includes an association request to connect to an access point. The method includes receiving a response message from a relay node, the response message indicating a communication path from the station to the access point via the relay node.

In a particular embodiment, a method includes receiving a probe request message from a station at a relay node, where the probe request message includes an association request to connect to an access point. The method further includes estimating a channel quality related to communicating with the station. The method also includes sending a modified request message to the access point, where the modified request message includes an indication of the estimated channel quality.

In a particular embodiment, an apparatus includes a processor and a memory storing instructions executable by the processor. The instructions are executable to detect receipt of one or more request messages from one or more relay nodes at an access point, where each of the one or more request messages is a probe request message or an association request message related to a station. The instructions are further executable to select a communication path between the access point and the station based on the one or more request messages and to initiate transmission of a response message indicating the selected communication path.

In a particular embodiment, an apparatus includes a processor and a memory storing instructions executable by the processor. The instructions are executable to detect receipt of at least two request messages related to a station at an access point, where a first request message of the at least two messages is received from a relay node, and where each of the at least two request messages is a probe request message or an association request message related to the station. The instructions are further executable to determine data rates corresponding to each request message and to select a communication path between the access point and the station based on the data rates.

In a particular embodiment, an apparatus includes a processor and a memory storing instructions executable by the processor. The instructions are executable to initiate transmission of a probe request message from a station, where the probe request message includes relay capability information of the station and where the probe request message includes an association request to connect to an access point. The instructions are further executable to detect receipt of a response message from a relay node. The response message indicates a communication path from the station to the access point via the relay node.

In a particular embodiment, an apparatus includes a processor and a memory storing instructions executable by the processor. The instructions are executable to detect receipt of a probe request message from a station at a relay node, where the probe request message includes an association request to connect to an access point. The instructions are further executable to estimate a channel quality related to communication with the station. The instructions are further executable to send a modified request message to an access point, where the modified request message includes an indication of the estimated channel quality.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIGS. 5A and 5B are graphs illustrating simulation results of the system of FIG. 1.

VI. DETAILED DESCRIPTION

Figure 1:
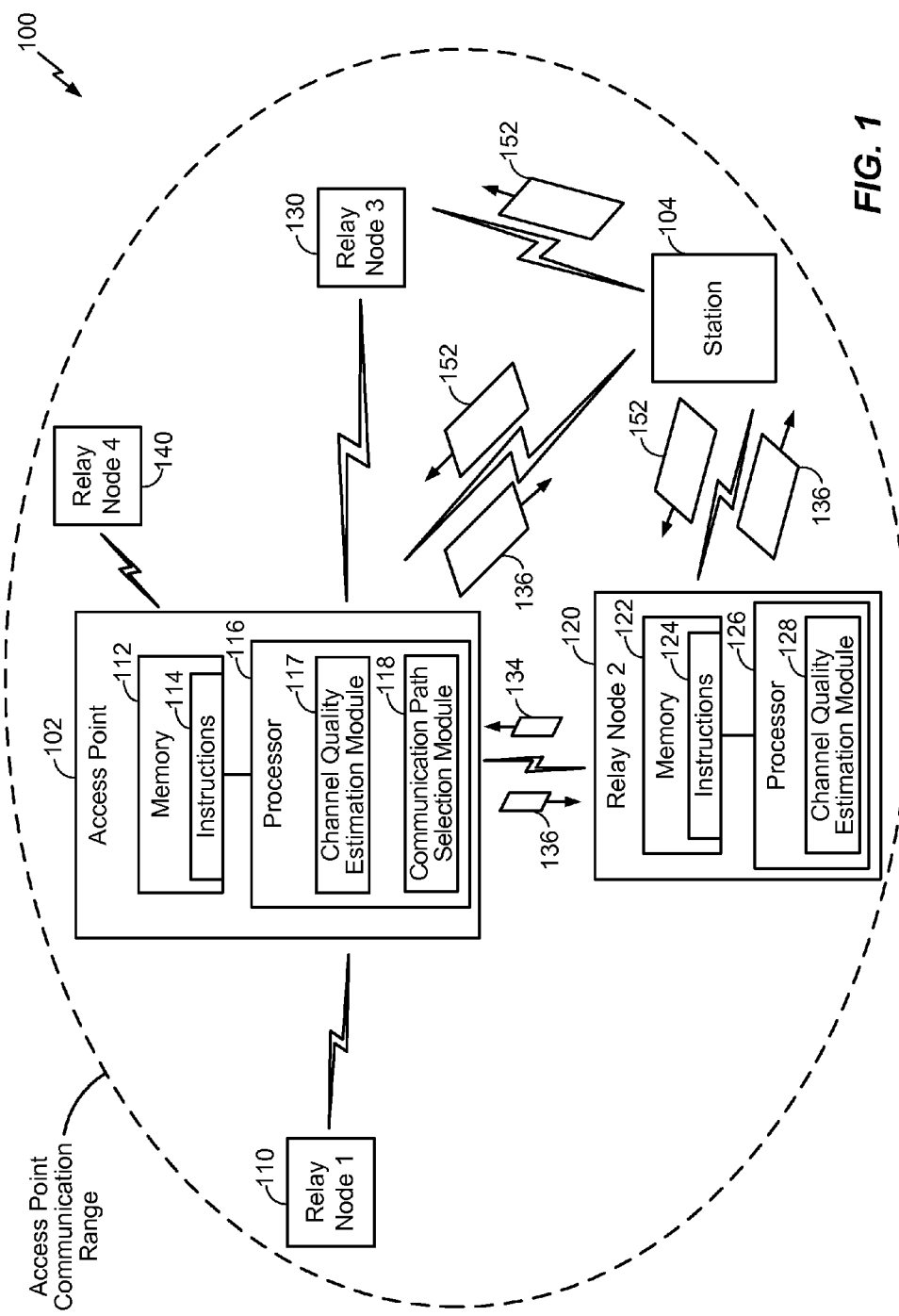
FIG. 1 is a diagram of a particular embodiment of a system operable to select and set up one or more relay nodes between a station and an access point.

Referring to FIG. 1, a diagram of a particular embodiment of a system operable to select and set up one or more relay nodes between a station and an access point is shown and generally designated 100. The system 100 includes an access point 102 in wireless communication with a station 104 and to a plurality of relay nodes 110, 120, 130, 140. In a particular embodiment, the plurality of relay nodes 110-140 and the station 104 may be wirelessly coupled to the access point 102 via a wireless communication network. For example, the wireless communication network may be based on an Institute of Electrical and Electronics Engineers (IEEE) 802.11ah protocol, where the access point 102, the plurality of relay nodes 110-140, and the station 104 are IEEE 802.11ah compliant devices. The relay nodes 110-140 (and possibly the station 104) may be located within a communication range of the access point 102.

The access point 102 may include a memory 112 coupled to a processor 116. The memory 112 may store instructions 114 executable by the processor 116. The access point 102 may include a communication path selection module 118. For example, the communication path selection module 118 may be implemented using hardware onboard the access point 102 (e.g., circuitry), may be implemented by the processor 116 executing the instructions 114, or may be implemented by a combination of hardware and the instructions 114 executed by the processor 116. In a particular embodiment, the communication path selection module 118 may be configured to select a communication path from the access point 102 to the station 104, in response to receiving one or more request messages from one or more of the relay nodes 110-140 (and possibly directly from the station 104) where each request message is related to the station 104. In a particular embodiment, the selected communication path may include at least one relay node of the plurality of relay nodes 110-140.

The plurality of relay nodes 110-140 may include a first relay node 110, a second relay node 120, a third relay node 130, and a fourth relay node 140. The relay nodes 110-140 may each include a processor and a memory coupled to the processor. To illustrate, the second relay node 120 may include a memory 122 coupled to a processor 126. The memory 122 may store instructions 124 executable by the processor 126. One or more of the relay nodes 110-140 may include a channel estimation module. For example, the second relay node 120 may include a channel quality estimation module 128. The channel quality estimation module 128 may be implemented using hardware onboard the second relay node 120 (e.g., circuitry), may be implemented by a processor 126 executing the instructions 124, or may be implemented by a combination of hardware and the instructions 124 executed by the processor 126. In a particular embodiment, the channel quality estimation module 128 may be configured to estimate a channel quality related to communicating with the station 104, in response to receiving a probe request message from the station 104 at the second relay node 120.

In a particular embodiment, the station 104 may include a mobile device, a camera, a multimedia player, an entertainment unit, a navigation device, a personal digital assistant (PDA), a portable computer, or any combination thereof. In another particular embodiment, the station 104 may include a wireless sensor or wireless meter configured to take measurements and to transmit the measurements to the access point 102. For example, the station 104 may be a smoke detector, a water meter, a temperature gauge, or a Wi-Fi device remotely located from the access point 102 and configured to transmit data to the access point 102 at certain time intervals. In addition, the station 104 may have a low duty cycle where the station 104 enters a sleep mode, a power off mode, or a power down mode to reduce power consumption of the station 104.

During operation, the station 104 may broadcast or multicast a request message 152. The request message 152 may include or correspond to a probe request message, an association request message, or a combination thereof. For example, the request message 152 may be sent by the station 104 at a time when the station 104 is not associated with the access point 102. The request message 152 may be received by one or more of the relay nodes 110-140 and/or the access point 102 within a communication range of the station 104.

For example, the request message 152 may include one or more addresses corresponding to the relay nodes 110-140 and to the access point 102, such as a multicast address that is monitored by the relay nodes 110-140 and the access point 102. In a particular embodiment, the request message 152 includes an association request to connect to the access point 102 and includes relay capability information of the station 104. For example, the relay capability information may indicate whether the station 104 is capable of transmitting data to the access point 102 via one or more of the relay nodes 110-140.

In one embodiment, the access point 102 may be within a communication range of the station 104. In this embodiment, the access point 102 may select a communication path to the station 104 that does not include a relay node, and a response message 154 is sent directly to the station 104 by the access point 102. Alternately, even if the access point 102 is within a communication range of the station 104, the communication path selection module 118 of the access point 102 may select a communication path to the station 104 that includes at least one of the relay nodes 110-140 (e.g., the second relay node 120). For example, the communication path selection module 118 may select a communication path that minimizes energy consumption at the station 101, maximizes throughput data rate between the station 104 and the access point 102, minimizes transmission time between the station 104 and the access point 102, or any combination thereof. In yet another embodiment, the access point 102 may be located outside a communication range of the station 104. In this embodiment, the request message 152 may be received by one or more of the relay nodes 110-140 (e.g., the second relay node 120) and not by the access point 102.

To illustrate, the second relay node 120 may receive the request message 152 from the station 104. In a particular embodiment, the channel quality estimation module 128 of the second relay node 120 may be configured to estimate a channel quality related to communication between the second relay node 120 and the station 104. For example, the channel quality estimation module 128 may estimate the channel quality based on a signal characteristic derived from the request message 152 sent from the station 104. In a particular embodiment, the signal characteristic includes a signal to noise ratio (SNR), a signal to interference plus noise ratio (SINR), a receive signal strength indication (RSSI), a modulation and coding scheme (MCS), or any combination thereof.

In response to receiving the request message 152, the second relay node 120 may send a modified request message 134 to the access point 102. The modified request message 134 may include an indication of the estimated channel quality. In some circumstances, more than one of the relay nodes 110-140 may receive the request message 152 from the station 104, and each of the relay nodes 110-140 that receives the request message 152 may estimate channel quality and generate modified request messages to be sent to the access point 102. Accordingly, the access point 102 may receive one or more modified request messages from the one or more relay nodes 110-140 that received the request message 152 in addition to or instead of receiving the request message 152 directly from the station 104.

In response to receipt of one or more request messages, which may include modified request messages sent by relay nodes (e.g., the modified request message 134), the request message 152 sent by the station 104, or both, the access point 102 may select a communication path to the station 104. The selected communication path may be selected from a set of prospective communication paths. To illustrate, each of the plurality of relay nodes 110-140 may correspond to a prospective communication path of the set of prospective communication paths. The set of prospective communication paths may also include a direct communication path between the access point 102 and the station 104. The selected communication path corresponds to a route to be used to transmit data between the access point 102 and the station 104. For example, the selected communication path may be a direct path between the access point 102 and the station 104 (i.e., no relay node is used). In another example, the selected communication path may include one or more of the plurality of relay nodes 110-140. To illustrate, the selected communication path may include the second relay node 120, in which case data transmitted by the station 104 will be received by the second relay node 120 and subsequently transmitted by the second relay node 120 to the access point 102.

The communication path selection module 118 of the access point 102 may select a prospective communication path as the selected communication path based on one or more data rates corresponding to the one or more request messages. The one or more data rates may include data rates between each of the one or more relay nodes 110-140 and the station 104. Additionally, the access point 102 may estimate channel quality associated with each received request message. For example, when the access point 102 receives the request message 152 from the station 104, the access point 102 may use a channel quality estimation module 117 to estimate channel quality associated with communicating directly with the station 104. Additionally or in the alternative, when the access point 102 receives the modified request message 134 from the second relay node 120, the access point 102 may use the channel quality estimation module 117 to estimate channel quality associated with communicating with the second relay node 120.

In one embodiment, the selected communication path may be a prospective communication path that results in a largest throughput between the access point 102 and the station 104. For example, the selected communication path may be selected to include at least one relay node that provides a maximum throughput among the relay nodes 110-140. In another embodiment, the communication path may be a prospective communication path that results in a lowest energy consumption at the station 104. For example, the communication path may be selected to include at least one relay node that minimizes energy consumption of the station 104 from among the relay nodes 110-140. In yet another embodiment, the communication path may be a prospective communication path that provides a smallest transmission time between the station 104 and the access point 102. For example, the communication path may be selected to include at least one relay node that minimizes transmission time from among the relay nodes 110-140.

After selecting the communication path (e.g., a best communication path to improve performance of the station 104), the access point 102 may send a response message 136 indicating the selected communication path. In a particular embodiment, the response message 136 may be sent directly to the station 104 if a direct path from the access point 102 to the station 104 improves performance of the station 104. However, the response message 136 may be sent to one or more relay node (e.g., the second relay node 120) if the communication path via the second relay node 120 improves performance of the station 104. The second relay node 120 may subsequently send the response message 136 to the station 104. The response message 136 may be sent to an address (e.g., a unicast address) associated with a relay node (e.g., the second relay node 120) that is part of the selected communication path or to an address (e.g., a unicast address) of the station 104 when the selected communication path is directly to the station 104.

Selecting the communication path at the access point 102 may include computing data rates for each of the prospective communication paths between the station 104 and the access point 102. In a particular embodiment, the communication path selection module 118 may be configured to compute an aggregate inverse data rate for each prospective communication path in the set of prospective communication paths between the station 104 and the access point 102. For example, the aggregate inverse data rate for an indirect (i.e., via at least one relay node 110-140) prospective communication path may be equal to a sum of inverse data rates for each hop of the indirect prospective communication path. The particular prospective communication path that has a lowest inverse data rate may be selected.

To illustrate, to achieve a maximum throughput (i.e., minimize medium occupancy), a particular communication path may be selected based on an inverse data rate that satisfies the following equation:

$$\text{Min}\left[\frac{1}{R(1,n)} + \frac{1}{R(2,n)}\right]$$

for all n, where $R(1,n)$ represents a data rate corresponding to a hop between the station 104 and a relay node n (e.g., the second relay node 120) and where $R(2,n)$ represents a data rate corresponding to a hop between the relay node n and the access point 102. However, if each value of $$\frac{1}{R(1,n)} + \frac{1}{R(2,n)}$$

is greater than 1/R (i.e., the inverse of a data rate corresponding to a direct path from the station 104 to the access point 102), the direct path may be selected as the communication path. It should be noted that communication paths may include more than one relay node (e.g., k relay nodes) between the station 104 and the access point 102. In this case, a communication path may be selected based on an inverse data rate that satisfies the following equation:

$$\text{Min}\left[\frac{1}{R(1,n)} + \frac{1}{R(2,n)} + \ldots + \frac{1}{R(k+1,n)}\right]$$

for k relay nodes between the station 104 and the access point 102.

Selecting the communication path at the access point 102 may also, or in the alternative, include computing a data rate for a hop from the station 104 to each relay node of each prospective communication path in the set of prospective communication paths between the station 104 and the access point 102, and selecting a particular prospective communication path that has a highest computed data rate. To illustrate, when the transmit power of the station 104 to each relay node is the same, to minimize energy consumption of the station 104 (i.e., because energy consumption is directly related to data rate), the communication path selection module 118 may select a communication path that satisfies the following equation:

Max[R(1,n)] for all n, where $R(1,n)$ represents a data rate corresponding to a hop between the station 104 and a relay node n (e.g., the second relay node 120). The communication path selection module 118 may determine a maximum data rate by comparing the data rates for each of the relay nodes 110-140. However, if each value of $R(1,n)$ for all n is less than a value R, corresponding to a data rate of a direct path, the communication path selection module 118 may select the direct path from the access point 102 to the station 104.

When the transmit power of the station 104 to each relay node varies, the energy consumption of the station 104 to transmit one bit to a particular relay node n may be represented by the following equation:

$$\text{Energy consumption} = \text{Tx\_power} * \frac{1}{R(1,n)},$$

where Tx_power is the transmit power and $R(1,n)$ is the transmit data rate to the particular relay node n.

It should be noted that the data rates may be based on payload data rates derived from the modified request messages 134 sent from the relay nodes 110-140. Alternately, the data rates may be based on media access control (MAC) layer throughputs for the modified request messages 134.

After selecting the communication path, the access point 102 may send the response message 136 to the station 104 via the relay node(s) (e.g., via the second relay node 120) corresponding to the selected communication path. Alternately, the access point 102 may send the response message 136 directly to the station 104 if the selected communication path is the direct communication path. The second relay node 120 may subsequently send the response message 136 (or another response message indicating the selected communication path) to the station 104.

Figure 2:
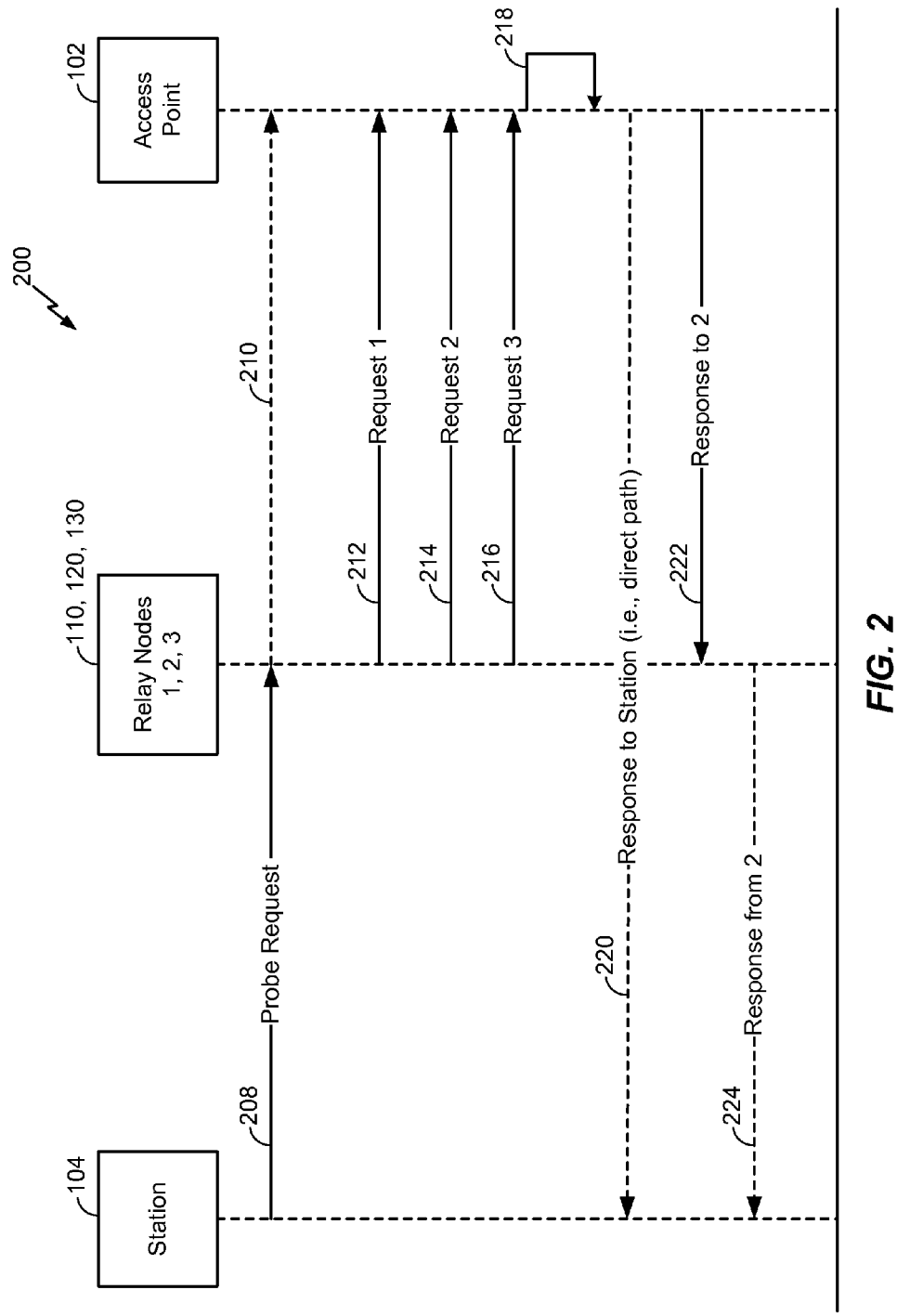
FIG. 2 is a diagram of particular embodiments of a method of transmitting messages between a station and an access point via one or more relay nodes in the system of FIG. 1.

Referring to FIG. 2, a diagram of particular embodiments of a method of transmitting messages between a station and an access point via one or more relay nodes is disclosed and generally designated 200. In FIG. 2, the station 104, relay nodes 110-130, and the access point 102 of FIG. 1 are shown.

At a first time, the station 104 may send a request message (e.g., a probe request message or another association request message), at 208. For example, the station 104 may send the request message to a multicast address associated with (e.g., monitored by) one or more relay nodes, such as the first relay node 110, the second relay node 120, and the third relay node 130 within a communication range of the station 104 (the fourth relay node 140 of FIG. 1 may be out of the communication range of the station 104). The multicast address may also be associated with (e.g., monitored by) the access point. In a particular embodiment, the request message may include relay capability information of the station 104 and an association request to connect to the access point 102. For example, the request message may be sent from the station 104 when the station 104 transitions out of a sleep mode or out of a power down mode and the station 104 wants to join a network (e.g., an IEEE 802.11ah complaint network). The request message may indicate that the station 104 is configured to communicate with the access point 102 via one or more relay nodes. For example, the request message may set one or more relay bits of a relay field. In addition, the request message may include one or more bits indicating other capability information of the station 104 such as adaptive rate control capability and multiple antenna configuration.

In some circumstances, the request message may be received directly by the access point 102, at 210. For example, if the access point 102 is within a communication range of the station 104, the access point 102 may receive the request message.

In response to receipt of the request message, one or more of the relay nodes 110-130 may send a request message related to the station 104 to the access point 102, at 212, 214, and 216, respectively. For example, request messages 1, 2, 3 may be sent from the first relay node 110, the second relay node 120, and the third relay node 130, respectively. In a particular embodiment, each of the request messages 1, 2, 3 is a modified request message based on the request message received from the station 104. For example, the modified request message may include an indication of an estimated channel quality related to a corresponding relay node communicating with the station 104. To illustrate, the first relay node 110 may estimate channel quality related to communication between the station and the first relay node 110 based on a signal characteristic derived from the request message received from the station 104. The signal characteristic may include a signal to noise ratio (SNR), a signal to interference plus noise ratio (SINR), a received signal strength indication (RSSI), a modulation and coding scheme (MCS), or any combination thereof. Thus, each of the relay nodes 110-130 may provide the access point 102 with the channel quality information to enable the access point 102 select a communication path for the station 104.

The method 200 may also include selecting a communication path to the station 104, at 218. For example, selecting the communication path to the station 104 may include selecting a direct path from the access point 102 to the station 104 or selecting a communication path via one or more of the relay nodes 110-130 to the station 104. In a particular embodiment, selecting the communication path to the station may include determining data rates corresponding to the modified request messages 1, 2, 3 received from the relay nodes 110-130, respectively. For example, a communication path selection module (such as the communication path selection module 118 of FIG. 1) of the access point 102 may determine and compare the data rates for each modified request message 1, 2, 3 and a data rate corresponding to communicating directly with the station 104 (i.e., a direct communication path without a relay node). In a particular embodiment, the communication path selection module may select a particular communication path that provides lowest energy consumption at the station 104 among a set of prospective communication paths. In another particular embodiment, the communication path selection module may select a particular communication path that provides a largest throughput rate between the access point 102 and the station 104 among the set of prospective communication paths. In another particular embodiment, the communication path selection module may select a particular communication path that provides a lowest transmission time between the access point 102 and the station 104 among the set of prospective communication paths. In still another embodiment, the communication path selection module may select a particular communication path among the set of prospective communication paths that provides a combination of low energy consumption, large throughput rate, and/or low transmission time.

If a direct communication path is selected, the method 200 may include, at 220, sending a response message to the station 104 from the access point 102. For example, the access point 102 may determine (e.g., based on the determined data rates) that the direct communication path to the station 104 improves performance (e.g., provides low power consumption, high throughput, or low transmission time) of the station 104, and the access point 102 may transmit the response message to the station 104.

If a communication path via a relay node is selected, the method 200 may include, at 222, sending the response message to selected relay node from the access point 102. For example, the access point 102 may select a particular path to the station 104 via the second relay node 120 and transmit the response message to the second relay node 120.

In a particular embodiment, the response message includes association response information. For example, the response message may permit the station 104 to be connected to or associated with the access point 102 and may include configuration information of the access point 102 that may enable the station 104 connect to the station.

The method 200 also includes sending the response message from the selected relay node to the station 104, at 224. For example, the second relay node 120 may send the response message to the station 104. In a particular embodiment, the response message may include the association response information and information regarding an initial MCS to be used by the station 104 for transmitting data. For example, the second relay node 120 may indicate to the station 104 an initial MCS that the station 104 may use to transmit data to the second relay node 120.

FIGS. 3, 4A, 4B, 5A, and 5B depict various statistical data representative of a plurality of simulations performed to select a communication path including at least one relay node between a station (e.g., the station 104 of FIG. 1) and an access point (e.g., the access point 102 of FIG. 1).

Figure 3:
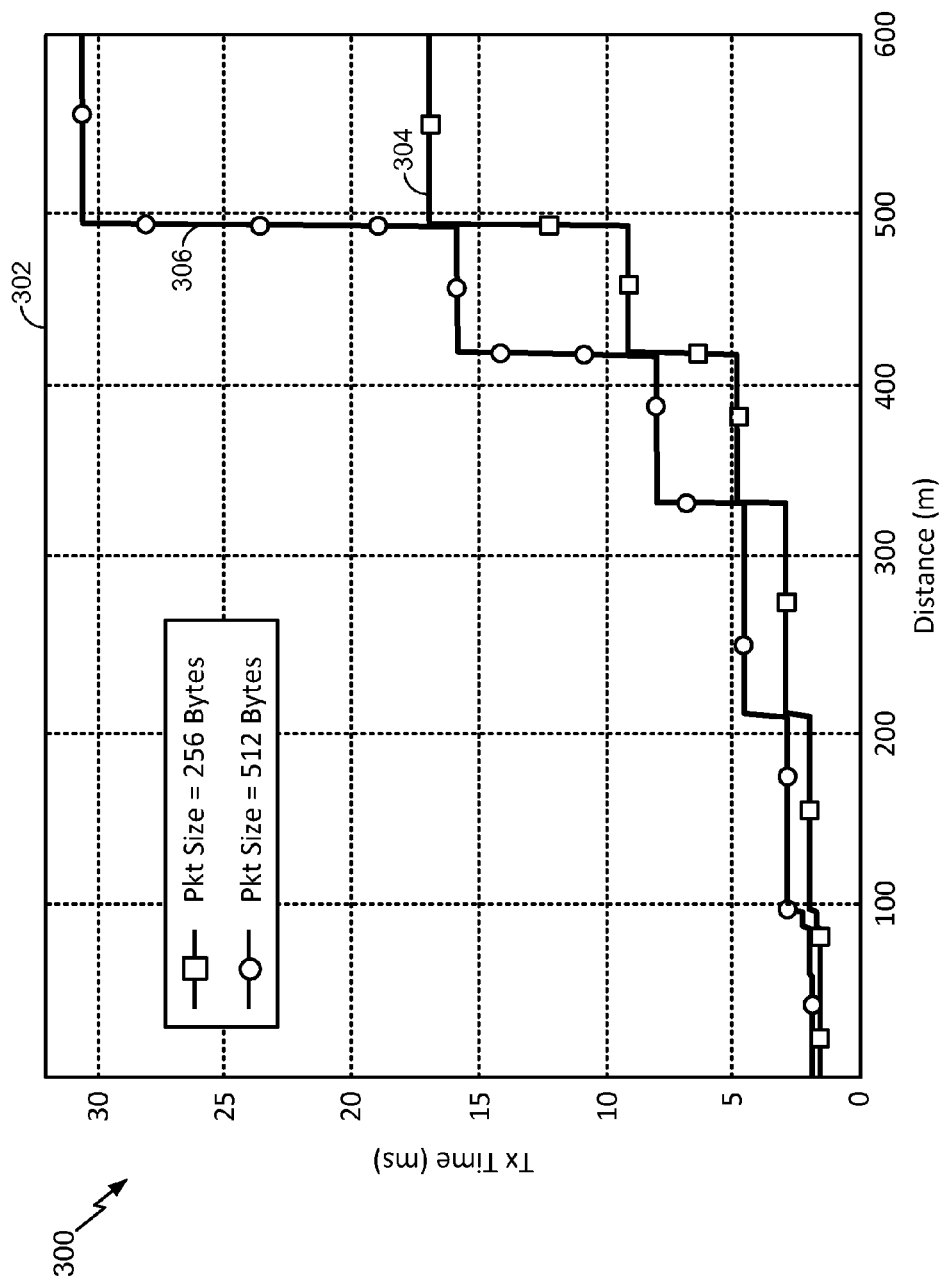
FIG. 3 is a graph illustrating simulation results of the system of FIG. 1.

FIG. 3 is a graphical illustration 302 of transmission time (in milliseconds (ms)) versus distance (in meters (m)) for transmitting a first data packet having a packet size of 256 bytes and a second data packet having a packet size of 512 bytes. In a first 304 scenario, the 256 byte packet is transmitted directly from the station 104 to the access point 102 (i.e., one hop). In a second 306 scenario, the 512 byte packet is transmitted from the station 104 to the access point 102 (i.e., one hop).

As shown in FIG. 3, transmitting the second data packet (i.e., 512 bytes) in a single hop (i.e., directly from the station 104 to the access point 102) takes about 31 seconds when the access point is located between about 500 m and about 600 m from the station 104. However, when a communication path is selected that includes a relay node (such as the second relay node 120 of FIG. 1) that is located about 300 m away from the station 104, the transmission time is about 4.5 s (i.e., for the first hop). Thus, a total transmission time to reach 600 m using two 300 m hops is about 9 s (i.e., 4.5 s×2 for each hop=9 s). In addition, energy consumption of the station 104 may be reduced since the station 104 is closer to the relay node (i.e., 300 m) than to the access point 102 (i.e., 600 m). The energy reduction achieved at the station 104 by using the relay node may be about 7 times less than when the second data packet is transmitted directly to the access point 102 (i.e., 31 s/4.5 s=7), because energy consumption is proportional to transmission time (similar analysis applies to the 256 byte packet).

Figures 4A, 4B:
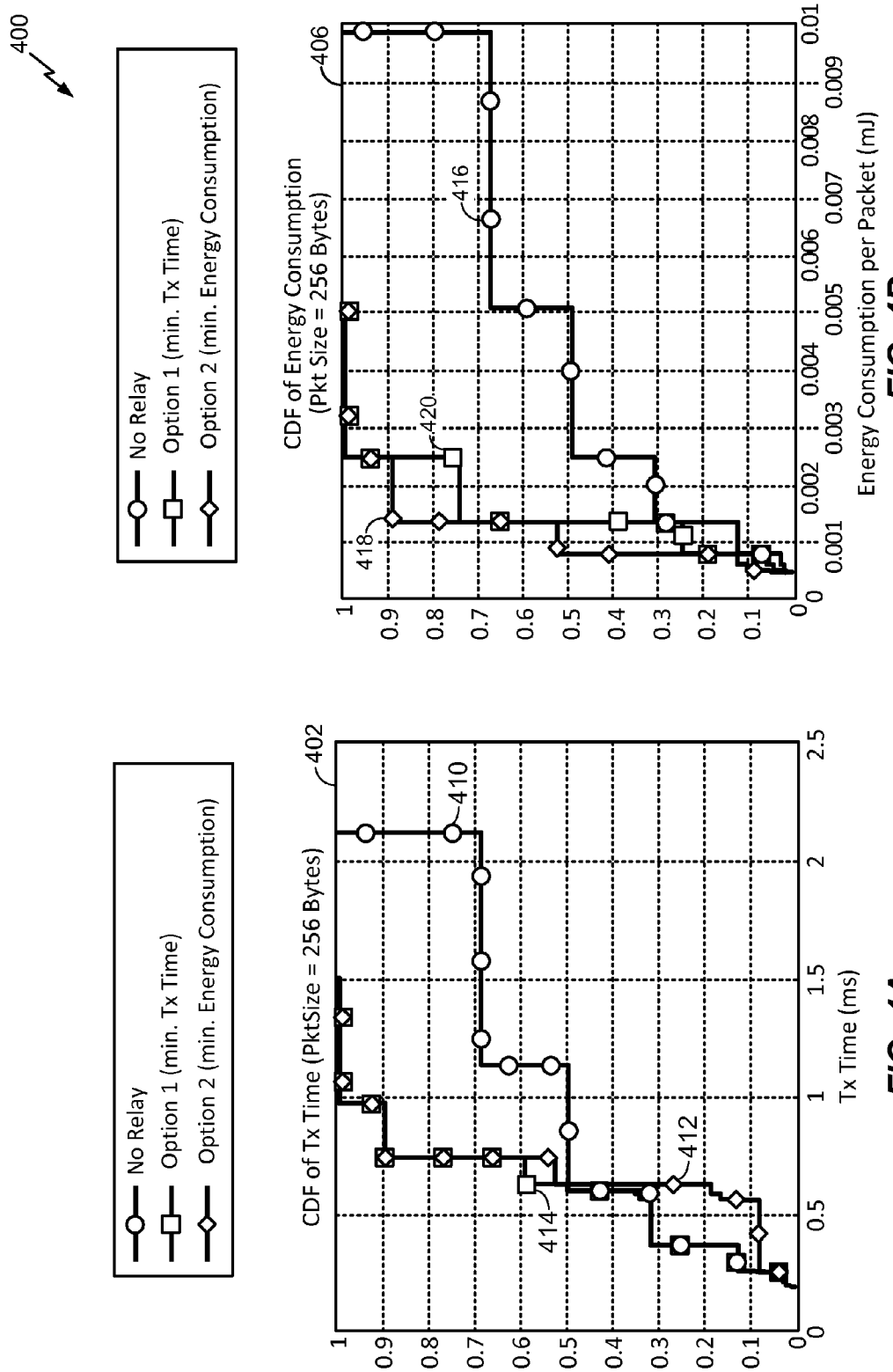
FIGS. 4A and 4B are graphs illustrating simulation results of the system of FIG. 1.

FIGS. 4A and 4B are graphical illustrations of transmission time and energy consumption, respectively, for transmitting a packet having a size of 256 bytes from a station (e.g., the station 104 of FIG. 1) to an access point (e.g., the access point 102 of FIG. 1) when a relay node is used and when no relay node is used (i.e., directly). Similarly, FIGS. 5A and 5B are graphical illustration of transmission time and energy consumption, respectively, for transmitting a packet having a size of 512 bytes.

The simulation parameters for FIGS. 4A, 4B, 5A, and 5B include an access point having two antennas and a station having a single antenna. The noise level for the simulation was set at 5 decibels (5B). A MCS-vs-SNR parameter was set at less than 1% packet error rate (PER) similar to an IEEE 802.11n 20 MHz channel D curve. The PHY preamble for the data packets (i.e., the 256 byte packet and the 512 byte packet) was 6 symbols. The following table summarizes the simulation configuration.

TABLE 1

Simulation System Configuration

| Parameter | Value |
|---|---|
| Carrier frequency | 915 MHz |
| Station transmit power (dBm) | 18 |
| Access point antenna gain (dBi) | 0 |
| Station Antenna gain (dBi) | −4 |
| Shadowing loss (dB) | 10 |
| Frequency diversity loss (dB) | 4.2/3.2/1.9 |
| Bandwidth (MHz) | 2/4/8 |

The simulation results indicate that selecting a communication path that includes at least one relay node can result in a reduced transmission time from the station to the access point and/or a reduced energy consumption at the station for 256 byte packets and 512 byte packets as compared to communicating directly between the station and the access point 102, as shown in FIGS. 4A-5B.

Figure 6:
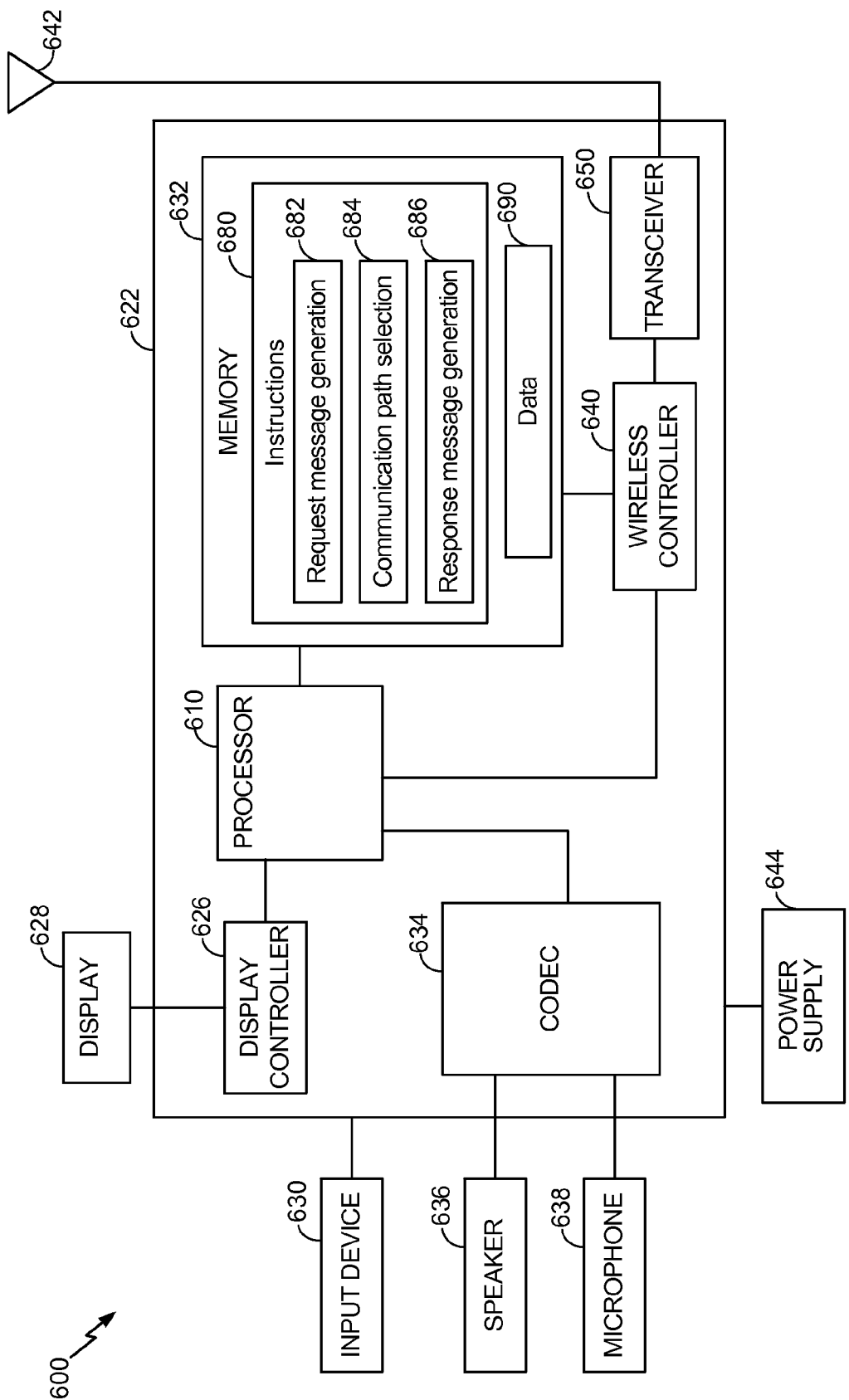
FIG. 6 is a block diagram of a particular embodiment of a station operable to transmit messages to an access point via one or more relay nodes.

Referring to FIG. 6, a block diagram of a particular embodiment of a wireless communication device 600 that may operate as a station, a relay node, an access point, or a combination thereof (e.g., a station that also functions as a relay node for other stations). The device 600 includes a processor 610 coupled to a memory 632.

The memory 632 may be a non-transitory computer readable storage medium that stores data 690 (e.g., data indicating a selected communication path), instructions 680, or both. In a particular embodiment, the instructions 680 are executable by the processor 610 to cause the processor 610 to perform one or more functions of the device 600. For example, the instructions 680 may include user applications, an operating system, or other executable instructions, or a combination thereof. The instructions 680 may be executable by the processor 610 to cause the processor to perform at least a portion of the functionality described with respect to FIGS. 1-5B.

For example, as a station, the device 600 may operate as described with reference to the station 104 of FIGS. 1 and 2. In this example, the instructions 680 may include request message generation instructions 682 that are executable by the processor 610 to generate a probe request message or other association request message for transmission to an access point (directly or via one or more relay nodes). In another example, as a relay node, the device 600 may operate as described with reference to the relay nodes 110, 120, 130, and 140 of FIG. 1 and/or the relay nodes 110, 120, and 130 of FIG. 2. In this example, the instructions 680 may include request message generations instructions 682 that are executable by the processor 610 to generate a modified request message based on a request message received from a station. The instructions 680 may also include response message generations instructions 686 that are executable by the processor 610 to generate a response message to a station based on a response message received from an access point.

In another example, as an access point, the device 600 may operate as described with reference to the access point 102 of FIGS. 1 and 2. In this example, the instructions 680 may include communication path selection instructions 684 that are executable by the processor 610 to select a particular communication path from a set of prospective communication paths. The instructions 680 may also include response message generation instructions 686 that are executable by the processor 610 to generate a response message indicating the selected communication path to a station or to a relay node.

The device 600 may also include a transceiver 650 for sending and receiving signals and/or messages (e.g., data packets). For example, the device 600 may function as a transmitter when the device 600 transmits request messages (e.g., the request message 152 of FIG. 1), or any other messages to an access point (e.g., the access point 102 of FIG. 1) and/or to one or more relay nodes (e.g., the relay nodes 110-140 of FIG. 1). As another example, the device 600 may function as a receiver when the device 600 receives the response message, or any other messages from the access point 102 and/or from the one or more relay nodes 110-140.

FIG. 6 also shows a display controller 626 that may be coupled to the processor 610 and to a display 628. A coder/decoder (CODEC) 634 (e.g., an audio and/or voice CODEC) may be coupled to the processor 610. A speaker 636 and a microphone 638 may be coupled to the CODEC 634. FIG. 6 also indicates that a wireless controller 640 may be coupled to the processor 610 and to the transceiver 650 that is coupled to a wireless antenna 642. In a particular embodiment, the processor 610, the display controller 626, the memory 632, the CODEC 634, the wireless controller 640, and the transceiver 650 are included in a system-in-package or system-on-chip device 622.

In a particular embodiment, an input device 630 and a power supply 644 are coupled to the system-on-chip device 622. Moreover, in a particular embodiment, as illustrated in FIG. 6, the display 628, the input device 630, the speaker 636, the microphone 638, the wireless antenna 642, and the power supply 644 are external to the system-on-chip device 622. However, each of the display 628, the input device 630, the speaker 636, the microphone 638, the wireless antenna 642, and the power supply 644 can be coupled to a component of the system-on-chip device 622, such as an interface or a controller.

Although FIG. 6 depicts a wireless communications device, the processor 610, the memory 632, other components of the device 600, or any combination thereof, may be integrated into other devices, such as a multimedia player, an entertainment unit, a navigation device, a personal digital assistant (PDA), a fixed location data unit, or a computer (e.g., a tablet computer, a laptop computer, a desktop computer, etc), a media device, a router or gateway device, an access point, a relay node, or another device configured to wirelessly communicate data.

In conjunction with the described embodiment, an apparatus is disclosed that includes means for receiving, at an access point, one or more request messages (e.g., probe request messages or association request messages) from one or more relay nodes, where each request message is related to a station. For example, the means for receiving may include the access point 102 of FIGS. 1 and 2, the device 600 of FIG. 6 or a portion thereof, one or more other devices configured to receive request messages, or a combination thereof.

The apparatus includes means for selecting a communication path between the access point and the station based on one or more request messages. For example, the means for selecting may include the access point 102 of FIGS. 1 and 2, the processor 116 of FIG. 1, the channel quality estimation module 117 of FIG. 1, the communication path selection module 118 of FIG. 1, the device 600 of FIG. 6 or a portion thereof, one or more other devices configured to select a communication path, or a combination thereof.

The apparatus also includes means for transmitting a response message indicating the selected communication path. For example, the means for transmitting may include the access point 102 of FIGS. 1 and 2, the device 600 of FIG. 6 or a portion thereof, one or more other devices configured to transmit a response message, or any combination thereof.

In conjunction with the described embodiments, an apparatus is disclosed that includes means for receiving at least two request messages (e.g., probe request messages or association request messages) related to a station at an access point, where a first request message of the at least two request messages is received from a relay node. For example, the means for receiving may include the access point 102 of FIGS. 1 and 2, the device 600 of FIG. 6 or a portion thereof, one or more other devices configured to receive at least two request messages, or a combination thereof.

The apparatus may include means for determining data rates corresponding to each request message. For example, the means for determining data rates may include the access point 102 of FIGS. 1 and 2, the processor 116 of FIG. 1, the channel quality estimation module 117 of FIG. 1, the communication path selection module 118 of FIG. 1, the device 600 of FIG. 6 or a portion thereof, one or more other devices configured to determine data rates, or any combination thereof.

The apparatus may also include means for selecting a communication path between the access point and the station based on the data rates. For example, the means for selecting may include the access point 102 of FIGS. 1 and 1, the processor 116 of FIG. 1, the channel quality estimation module 117 of FIG. 1, the communication path selection module 118 of FIG. 1, the device 600 of FIG. 6 or a portion thereof, one or more other devices configured to select a communication path, or any combination thereof.

In conjunction with the described embodiments, an apparatus is disclosed that includes means for transmitting a probe request message from a station, where the probe request message includes relay capability information of the station and where the probe request message includes an association request to connect to an access point. For example, the means for transmitting the probe request may include the station 104 of FIGS. 1 and 2, the device 600 of FIG. 6, the transceiver 650 of FIG. 6, the antenna 642 of FIG. 6, one or more other devices configured to transmit a probe request, or any combination thereof.

The apparatus may also include means for receiving a response message from a relay node, the response message indicating a communication path from the station to the access point via the relay node. For example, the means for receiving the response message may include the station 104 of FIGS. 1 and 2, the device 600 of FIG. 6, the transceiver 650 of FIG. 6, the antenna 642 of FIG. 6, one or more other devices configured to receive a response message, or any combination thereof.

In conjunction with the described embodiments, an apparatus is disclosed that includes means for receiving a probe request message from a station at a relay node where the probe request message includes an association request to connect to an access point. For example, the means for receiving may include the relay nodes 110-140 of FIG. 1, the relay nodes 110-130 of FIG. 2, the device 600 of FIG. 6 or a portion thereof, one or more other devices configured to receive the probe request message, or any combination thereof.

The apparatus also includes means for estimating channel quality related to communication with the station. For example the means for estimating channel quality may include the relay nodes 110-140 of FIG. 1, the relay nodes 110-130 of FIG. 2, the processor 126 of FIG. 1, the channel quality estimation module 128 of FIG. 1, the device 600 of FIG. 6 or a portion thereof, one or more other devices configured to estimate channel quality, or any combination thereof.

The apparatus may also include means for transmitting a modified request message to the access point, where the modified request message includes an indication of the estimated channel quality. For example, the means for transmitting may include the relay nodes 110-140 of FIG. 1, the relay nodes 110-130 of FIG. 1, the device 600 of FIG. 6 or a portion thereof, one or more other devices configured to transmit a modified request message, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
   receiving, at an access point, a request message from a station directly and receiving one or more request messages from one or more relay nodes, wherein the request message from the station comprises a probe request message or an association request message to connect to the access point and includes relay capability information of the station, and wherein each of the one or more request messages from the one or more relay nodes comprises a probe request message or an association request message related to the station;

selecting a communication path between the access point and the station based on one or more of the request message from the station and the one or more request messages from the one or more relay nodes; and sending a response message indicating the selected communication path.

2. The method of claim 1, wherein the selected communication path includes at least one relay node and wherein the response message is sent to the at least one relay node.

3. The method of claim 1, wherein the selected communication path does not include a relay node and wherein the response message is sent directly to the station.

4. The method of claim 1, wherein the selected communication path is selected based on one or more data rates corresponding to the one or more request messages.

5. The method of claim 4, wherein the one or more data rates include data rates between each of the one or more relay nodes and the station.

6. The method of claim 4, wherein the selected communication path is selected based on at least one relay node of the one or more relay nodes that provides increased throughput between the access point and the station.

7. The method of claim 4, wherein the selected communication path is selected from a set of prospective communication paths, wherein each relay node of the one or more relay nodes corresponds to a prospective communication path of the set of prospective communication paths, and wherein the selected communication path utilizes less energy of the station for transmission of data than other communication paths of the set of prospective communication paths.

8. The method of claim 7, wherein energy consumption of the station associated with a particular communication path is estimated as a product of a transmit power of the station to a particular relay node of the particular communication path and an inverse of a transmit data rate to the particular relay node.

9. The method of claim 4, wherein the selected communication path is selected from a set of prospective communication paths, wherein each relay node of the one or more relay nodes corresponds to a prospective communication path of the set of prospective communication paths, and wherein the selected communication path utilizes less transmission time between the station and the access point than other communication paths of the set of prospective communication paths.

10. The method of claim 4, wherein selecting the communication path comprises:

computing an aggregate inverse data rate for each prospective communication path in a set of prospective communication paths between the station and the access point, wherein the aggregate inverse data rate for an indirect prospective communication path is equal to a sum of inverse data rates for each hop of the indirect prospective communication path, wherein the selected communication path is a particular prospective communication path that has a lowest aggregate inverse data of the set of prospective communication paths.

11. The method of claim 4, wherein selecting the communication path comprises:

computing a data rate for a hop from the station to each relay node of each prospective communication path in a set of prospective communication paths between the station and the access point, wherein the selected communication path is a particular prospective communication path that has a highest computed data rate of the set of prospective communication paths.

12. The method of claim 4, wherein the one or more data rates corresponds to a payload data rate of the one or more request messages.

13. The method of claim 4, wherein the one or more data rates corresponds to a media access control (MAC) layer throughput of the one or more request messages.

14. The method of claim 4, wherein the one or more data rates is determined based on a signal characteristic of the one or more request messages, and wherein the signal characteristic comprises a signal to noise ratio (SNR), a signal to interference plus noise ratio (SINR), a received signal strength indication (RSSI), a modulation and coding scheme (MCS), or any combination thereof.

15. The method of claim 1, wherein the request message from the station comprises a multicast request message, wherein the multicast request message is addressed to a multicast address associated with the one or more relay nodes and the access point, and wherein the selected communication path is selected based at least partially on the multicast request message.

16. The method of claim 1, wherein the one or more request messages is transmitted via unicast from the one or more relay nodes to the access point in response to the one or more relay nodes receiving a multicast request message from the station at a multicast address associated with the one or more relay nodes and the access point.

17. The method of claim 1, wherein the selected communication path is based on an Institute of Electrical and Electronics Engineers (IEEE) 802.11ah protocol and wherein the station is an IEEE 802.11ah compliant device.

18. The method of claim 1, wherein the response message further indicates an initial modulation and coding scheme (MCS) to be used by the station when transmitting data.

19. The method of claim 1, wherein the one or more request messages is sent in response to the station waking from a sleep mode or in response to the station powering up.

20. The method of claim 1, wherein the selected communication path is selected based on the request message from the station and based on the one or more request messages from the one or more relay nodes.

21. The method of claim 1, wherein a particular request message of the one or more request messages is received from a particular relay node, wherein the particular request message includes an estimate of a channel quality related to communication between the particular relay node and the station, and wherein the selected communication path is selected based at least partially on the estimate of the channel quality.

22. An apparatus comprising:

a processor; and a memory storing instructions executable by the processor to:

detect receipt of a request message from a station directly and receipt of one or more request messages from one or more relay nodes at an access point, wherein the request message from the station comprises a probe request message or an association request message to connect to the access point and includes relay capability information of the station, and wherein each of the one or more request messages from the one or more relay nodes comprises a probe request message or an association request message related to the station;

select a communication path between the access point and the station based on one or more of the request message from the station and the one or more request messages from the one or more relay nodes; and initiate transmission of a response message that indicates the selected communication path.

23. The apparatus of claim 22, wherein the selected communication path is selected based on one or more data rates corresponding to the one or more request messages.

24. The apparatus of claim 23, wherein the one or more data rates is determined based on a payload data rate corresponding to each of the one or more request messages.

25. The apparatus of claim 23, wherein the one or more data rates is determined based on a media access control (MAC) layer throughput rate corresponding to each of the one or more request messages.

26. The apparatus of claim 22, wherein the access point communicates based on an Institute of Electrical and Electronic Engineers (IEEE) 802.11ah protocol and wherein the station is an IEEE 802.11ah compliant device.

27. The apparatus of claim 22, wherein the response message further indicates an initial modulation and coding scheme (MCS) to be used by the station for communication.

28. The apparatus of claim 22, wherein the request message from the station is received via a multicast address that is associated with the access point and associated with the one or more relay nodes.

29. The apparatus of claim 28, wherein the response message is transmitted to a unicast address that is associated with a particular relay node of the one or more relay nodes or associated with the station.

30. The apparatus of claim 22, wherein the processor is integrated into a mobile device, a camera, a multimedia player, an entertainment unit, a navigation device, a personal digital assistant (PDA), a portable computer, or any combination thereof.

31. The apparatus of claim 22, wherein a particular request message of the one or more request messages is received from a particular relay node, and wherein the particular request message includes an estimate of a channel quality related to communication between the particular relay node and the station.

32. An apparatus comprising:
means for receiving, at an access point, a request message from a station directly and one or more request messages from one or more relay nodes, wherein the request message from the station comprises a probe request message or an association request message to connect to the access point and includes relay capability information of the station, and wherein each of the one or more request messages from the one or more relay nodes comprises a probe request message or an association request message related to a station;

circuitry for selecting a communication path between the access point and the station based on one or more of the request message from the station and the one or more request messages from the one or more relay nodes; and means for transmitting a response message indicating the selected communication path.

33. The apparatus of claim 32, wherein the communication path is selected based on one or more data rates corresponding to the one or more request messages.

34. The apparatus of claim 33, wherein the one or more data rates is determined based on a payload data rate corresponding to each of the one or more request messages, based on a media access control (MAC) layer throughput rate corresponding to each of the one or more request messages, or a combination thereof.

35. The apparatus of claim 32, wherein the response message further indicates an initial modulation and coding scheme (MCS) to be used by the station for communication.

36. The apparatus of claim 32, wherein a particular request message of the one or more request messages is received from a particular relay node, wherein the particular request message includes an estimate of a channel quality related to communication between the particular relay node and the station, and wherein the means for selecting a communication path selects the selected communication path based at least partially on the estimate of the channel quality.

37. A computer-readable storage device comprising instructions that, when executed by a processor, cause the processor to perform operations including:
detecting receipt of a request message from a station directly and one or more request messages from one or more relay nodes at an access point, wherein the request message from the station comprises a probe request message or an association request message to connect to the access point and includes relay capability information of the station, and wherein each of the one or more request messages from the one or more relay nodes comprises a probe request message or an association request message related to the station;

selecting a communication path between the access point and the station based on one or more of the request message from the station and the one or more request messages from the one or more relay nodes; and initiating transmission of a response message indicating the selected communication path.

38. The computer-readable storage device of claim 37, wherein the selected communication path is selected based on one or more data rates corresponding to the one or more request messages.

39. The computer-readable storage device of claim 37, wherein the response message further indicates an initial modulation and coding scheme (MCS) to be used by the station when transmitting data.

40. The computer-readable storage device of claim 37, wherein a particular request message of the one or more request messages is received from a particular relay node, wherein the particular request message includes an estimate of a channel quality related to communication between the particular relay node and the station, and wherein the selected communication path is selected based at least partially on the estimate of the channel quality.

* * * * *